United States Patent Office 3,641,101
Patented Feb. 8, 1972

3,641,101
PROCESS FOR THE MANUFACTURE OF ACRYLO-
NITRILE BY AMMOXIDATION OF PROPYLENE
Keisho Yamada, Shigeki Nagai, Kyoji Odan Yasutaka, Arima, and Mikio Hidaka, Ube-shi, Japan, assignors to Ube Industries, Ltd., Yamaguchi-ken, Japan
No Drawing. Filed Apr. 17, 1969, Ser. No. 817,191
Claims priority, application Japan, Sept. 3, 1968, 43/62,785
Int. Cl. C07c 121/02
U.S. Cl. 260—465.3                                    1 Claim

ABSTRACT OF THE DISCLOSURE

In the process of manufacturing acrylonitrile by contacting propylene, ammonia and oxygen with a solid oxidizing catalyst in the vapor phase at a temperature of 350–500° C., the improvement wherein said solid oxidizing catalyst consists essentially of (A) a solid solution of antimony oxide and stannic oxide wherein the atomic ratio expressed in percentage of the antimony and tin is within the range of Sb=70–30% and Sn=30–70%, and (B) an oxide of a metal selected from the group consisting if indium, iridium and ruthenium;

the weight ratio of solid solution (A) to said metal oxide (B) being within the range 98:2–80:20.

---

This invention relates to a process for the manufacture of acrylonitrile from propylene by ammoxidation and, in particular to a process by which acrylonitrile can be obtained with high selectivity by reacting propylene with ammonia and oxygen in the presence of a catalyst of new composition.

Numerous proposals have been made in the past regarding the method of producing acrylonitrile by the so-called ammoxidation of propylene which involves the vapor phase oxidation of propylene with either oxygen or air in the presence of ammonia. For example, British patent specification No. 876,446 discloses a method of producing unsaturated aliphatic nitriles by using a catalyst comprising oxides of antimony and tin and/or compounds of antimony, tin and oxygen. However, in this case, the by-products reach as high as 30–40%, and thus is becomes difficult to obtain acrylonitrile of high purity commercially advantageously by separating and removing the by-products from the acrylonitrile.

We found that a catalyst obtained by selecting a solid solution of antimony oxide and stannic oxide in which the atomic ratio expressed in percentage of antimony and tin is in the ranges of Sb=70–30% and Sn=30–70% and combining this solid solution with an oxide of a metal selected from the group consisting of indium, iridium and ruthenium has the effects of advancing the reaction at relatively low temperatures in the ammoxidation of propylene and of controlling the formation of by-products such as acetonitrile, propionitrile, cyanic acid, acrolein, carbon monoxide and carbon dioxide to minute amounts to provide acrylonitrile at high selectively.

Thus, according to the present invention, in the process of manufacturing acrylonitrile by contacting propylene, ammonia and oxygen with a solid oxidizing catalyst in the vapor phase at a temperature of 400–600° C., a method is provided which is characterized in that said oxidizing catalyst consists essentially of (A) a solid solution of antimony oxide and stannic oxide in which the atomic ratio expressed in percentage of antimony and tin is in the ranges of Sb=70–30% and Sb=30–70%, and (B) an oxide of a metal selected from the group consisting of indium, iridium and ruthenium; and wherein the weight ratio of the aforesaid solid solution (A) to said metal oxide (B) is in the range of 98:2–80:20.

The atomic ratio expressed in percentage of the two components of antimony oxide and stannic oxide that make up the solid solution, the first component (A) of the present invention, is within the ranges of Sb=70–30% and Sn=30–70%, and preferably Sb=50–30% and Sn=50–70%. We found that when the soluble salts of tin and antimony, preferably the chlorides thereof, were used as the starting material for preparation of the catalyst and these were coprecipitated as either hydroxides or oxides, the components were not just a mixture in a state of the respective oxides after calcination but existed as a solid solution of the oxides of the two components, and especially as a solid solution in which the atomic ratio expressed in percentage was in the ranges of Sn=30–70% and Sn=70–30%. It is important that the antimony oxide and stannic oxide exist as a solid solution in the case of the first component of the invention catalyst. A high selectivity for acrylonitrile as demonstrated by the invention catalyst cannot be achieved by a mere mixture of antimony oxide and stannic oxide even when such a mixture is combined with indium, iridium or ruthenium oxide.

The second component (B) of the invention catalyst is a metal oxide selected from the group consisting of indium oxide ($In_2O_3$), iridium oxides ($Ir_2O_3$) and ruthenium oxide ($RuO_2$). Needless to say, these metal oxides can be used either alone or in combinations of a plurality thereof.

Although the selectivity for acrylonitrile from propylene is low when either of the catalyst components of the invention is used alone, it becomes possible to obtain acrylonitrile from propylene with a high selectivity reaching as high as 80% or more by the use of the combination of these two components. Thus, the proportion in which said solid solution (A) and metal oxide (B) are used is preferably in a weight ratio range of $A:B$=98.2–80:20.

The invention catalyst can be prepared in the following manner. Soluble salts of antimony and tin are mixed in a solution state in such a proportion that the atomic ratio expressed in percentage of antimony and tin is Sb=70–30% and Sn=30–70%. Useable salts are, for example, the chlorides, nitrates and carbonates or the organic acids salts such as formates and acetates, but the chlorides are especially preferred. Ammonia water is added to this solution to effect hydrolysis and the coprecipitation of the oxides and/or hydroxides of antimony and tin. The precipitate is then calcined at 300–700° C., and preferably 500–600° C., for 5–30 hours, and preferably 5–20 hours, to obtain the solid solution of antimony oxide and stannic oxide. Either indium, iridium and ruthenium oxide is mixed with the foregoing solid solution, and the mixture is again calcined at 300–700° C., and particularly 500–600° C., for 5–30 hours, and particularly 5–20 hours, followed by screening of the product to the desired particle size.

A preferred method of preparing the catalyst is specifically described below.

Stannous chloride is dissolved in 1% hydrochloric acid. This solution is slowly added dropwise to water with vigorous stirring, while simultaneously a solution of antimony pentachloride is also dropped. This mixture is then cooled to room temperature and diluted with water. The pH is then adjusted to 5.5–6.5 by the further addition of dilute ammonia water. The resulting precipitate is filtered, washed by floating in water, then dried at 120° C. and heated at 380° C. in air for 3 hours and thereafter heated at 540° C. for 16 hours, whereupon a solid solution of oxides of antimony and tin results. After crushing this to 100–200 mesh, an oxide of either indium, iridium or ruthenium is added such as to be contained in an amount of 2–20% by weight.

This mixture is then kneaded into paste form with water, dried at 120° C. for one hour and thereafter again calcined at 540° C. for 16 hours to obtain the catalyst.

The foregoing catalyst to be used in this invention can be used supported in optional proportions on various classes of carriers. Preferable carriers include, for instance, silica gel, alumina, Carborundum, alumina or silica-alumina which are relatively inert. But aside from these also useable are kaolin, pumice and diatomaceous earth. These carriers can be used in the range of 10–90% by weight based on the overall weight of the catalyst.

The catalyst of the invention will vary depending upon the manner of combination of the components and their conditions of preparation but, generally speaking, they possess specific surface areas of 1–3 m.$^2$/g.

There is no particular restriction as to the size of the catalyst particles. Any size which is known per se depending upon whether the catalyst is to be used as a fluidized bed or as a fixed bed can be used. Further, it is possible to provide the catalyst with adequate mechanical strength by molding it into pellet or granular form by means of the usually employed techniques of molding catalysts. The activity of the catalyst is not affected by the type of the molding method employed.

According to the invention process, except that the hereinbefore described catalyst is used, the ammoxidation of propylene can otherwise be carried out in accordance with the processing conditions which per se are known.

The propylene used as the starting material in the invention process need not necessarily be of high purity. For instance, propane, ethylene and ethane, which may be contained in the propylene, are effective as diluents. However, the butenes and acetylenes should preferably be removed so far as possible, since they are likely to cause unnecessary side reactions.

Oxygen of high purity is not necessarily required as the oxygen source, and usually the use of air will do for reasons of economy. The amount of oxygen fed is suitably 0.8–3.0 molar times the quantity of the propylene, a range of 1.5–2.0 molar times being especially convenient. On the other hand, the amount of ammonia fed is preferably in the range of 0.5–3.0 molar times, and particularly 0.8–1.2 molar times, the quantity of the propylene. Further, nitrogen, carbon dioxide and steam can also be added as diluent gases. Steam is not only effective in this respect but also has the effect of enhancing the selectivity for the intended acrylonitrile and of prolonging the activity of the catalyst by checking the decline of the catalytic activity. Hence, the addition of at least one mol of steam per mol of the propylene is desirable.

A reaction temperature of 350–500° C. is suitable, and particularly preferred is a temperature ranging from 380–420° C.

A contact time of 0.5–40 seconds, and particularly 2–20 seconds, is preferred.

While the reaction is usually carried out at atmospheric pressure, it is also possible to conduct the reaction with the application of a pressure of low degree or under reduced pressure.

Although the invention process can be readily carried out by employing known vapor phase reaction apparatus which uses the catalyst as a fixed, moving or fluidized bed, the use of a reaction apparatus of the fixed bed type is of particular advantage from the standpoint of the life of the catalyst.

The recovery of the intended acrylonitrile from the reaction product can be accomplished in the following manner. The effluent gas from the reaction apparatus is contacted with either cold water or other solvents of acrylonitrile to extract the acrylonitrile, following which this is submitted to fractional distillation. It is, of course, possible to treat the effluent gas with an aqueous acid solution, e.g., aqueous sulfuric acid solution for neutralizing the excess ammonia prior to extraction of the acrylonitrile. According to the invention process, acrylonitrile can be obtained from propylene at a very high selectivity. In addition, the formation of by-products such as acetonitrile, propionitrile, cyanic acid, acrolein, carbon monoxide and carbon dioxide is small. Hence, the purification step can be made much simpler than that of the conventional methods, and furthermore acrylonitrile of high purity can be provided at low cost.

For a better understanding of the invention, the following examples and comparisons are given. Unless otherwise noted, the parts in the examples are on a weight basis.

EXAMPLE 1

A solution in 100 parts of 1% hydrochloric acid of 100 parts of stannous chloride was slowly added to 1000 parts of water with vigorous stirring, while simultaneously 79 parts of antimony pentachloride were also added dropwise. When the additions were completed, the temperature had risen to 85° C. in 5 minutes. This mixture was cooled to room temperature, diluted by addition of 350 parts of water and the pH was also adjusted to 5.5–6.5 by the addition of dilute ammonia water. The resulting precipitate was filtered and washed by floating in water. After repeating this washing and filtration operation three times, the precipitate was dried at 120° C., heated at 380° C. for 3 hours in air and thereafter heated at 540° C. for 16 hours to obtain a solid solution of the oxides of antimony and tin in which the atomic ratio of antimony to tin was 40:60. This solid solution was pulverized. To 50 grams of the pulverized solid solution were added 2.5 grams (5 wt. percent) of iridium oxide ($Ir_2O_3$), following which the mixture was kneaded into paste form with water. The pasty product was then dried at 120° C. for 2 hours, following which it was heated at 540° C. for 16 hours and thereafter screened to 14–20 mesh (Tyler standard sieve) to obtain the catalyst.

Fifteen cc. of the foregoing catalyst were packed in a U-shaped stainless steel reaction tube having an inside diameter of 16 mm., after which the tube was placed in a salt bath, and the temperature inside the tube was maintained at 400° C.

A gas mixture consisting of propylene, ammonia, steam and air in a mole ratio of 1:1:1:7 was passed through the reaction tube at the rate of 80 cc. per minute and reacted. The contact time was 11.25 seconds. The conversion of the propylene was 61.2%, and the selectivity for the several products were as shown in Table I.

TABLE I

| Product: | Selectivity (percent) |
|---|---|
| Acrylonitrile | 81.0 |
| Acetonitrile | 5.6 |
| Acrolein | 2.0 |
| Cyanic acid | 1.4 |

Comparisons 1–5

The ammoxidation of propylene was carried out as in Example 1 except that a solid solution of antimony oxide and stannic oxide of a composition indicated in Table II, below, was used alone.

The results obtained are shown in Table II.

TABLE II

| Comparison | Atomic ratio of Component A | | Component B | | Conversion of propylene (percent) | Selectivity | | | |
|---|---|---|---|---|---|---|---|---|---|
| | Sb | Sn | Class | Amount added based on overall weight (wt. percent) | | Acrylonitrile | Acetonitrile | Cyanic acid | Acrolein |
| 1 | 40 | 60 | | | 59.6 | 61.5 | 5.2 | 4.1 | 2.5 |
| 2 | 50 | 50 | | | 57.4 | 60.2 | 5.1 | 3.8 | 1.9 |
| 3 | 30 | 70 | | | 55.6 | 53.6 | 5.7 | 3.1 | 3.0 |
| 4 | 80 | 20 | | | 39.1 | 41.6 | 6.5 | 5.2 | 1.0 |
| 5 | 20 | 80 | | | 65.0 | 26.3 | 1.2 | 1.6 | 0.8 |

EXAMPLES 2–6

The reaction was carried out under identical conditions as in Example 1 using the catalyst prepared as described therein, except that the amount of the oxide of iridium, indium or ruthenium added to the solid solution of oxides of antimony and tin (atomic ratio antimony:tin=40:60) was varied. The results obtained are shown in Table III.

TABLE III

| Example | Metal oxide | | Conversion of propylene (percent) | Selectivity | | | |
|---|---|---|---|---|---|---|---|
| | Class | Amount added (wt. percent) | | Acrylonitrile | Acetonitrile | Cyanic acid | Acrolein |
| 2 | Iridium oxide ($Ir_2O_3$) | 15 | 62.0 | 80.3 | 4.8 | 1.3 | 2.5 |
| 3 | Indium oxide ($In_2O_3$) | 5 | 58.0 | 82.1 | 3.6 | 1.5 | 1.4 |
| 4 | do | 15 | 59.6 | 81.6 | 5.8 | 1.7 | 1.9 |
| 5 | Ruthenium oxide ($RuO_2$) | 5 | 56.4 | 79.6 | 6.5 | 1.8 | 2.5 |
| 6 | do | 15 | 58.4 | 78.5 | 6.3 | 2.0 | 2.7 |

Comparisons 6–10

The ammoxidation of propylene was carried out as in Example 1, except that use was made of a solid solution of antimony oxide and stannic oxide of a composition indicated in Table IV, along with indium oxide in a proportion as indicated in said Table IV.

The results obtained are shown in Table IV.

TABLE IV

| Comparison | Atomic ratio of Component A | | Component B | | Conversion of propylene (percent) | Selectivity | | | |
|---|---|---|---|---|---|---|---|---|---|
| | Sb | Sn | Class | Amount added based on overall weight (wt. percent) | | Acrylonitrile | Acetonitrile | Cyanic acid | Acrolein |
| 6 | 40 | 60 | $In_2O_3$ | 1 | 58.3 | 62.8 | 5.3 | 4.0 | 3.0 |
| 7 | 40 | 60 | $In_2O_3$ | 30 | 64.3 | 65.2 | 7.3 | 5.2 | 1.1 |
| 8 | 80 | 20 | $In_2O_3$ | 15 | 50.2 | 46.1 | 5.5 | 5.6 | 1.2 |
| 9 | 20 | 80 | $In_2O_3$ | 15 | 67.2 | 30.1 | 2.3 | 2.0 | 1.6 |
| 10 | | | $In_2O_3$ | 100 | 53.4 | 40.6 | 4.2 | 3.6 | 0.5 |

When the foregoing working examples and comparisons are considered, it can be appreciated that for holding the formation of such by-products as acetonitrile, cyanic acid, acrolein, carbon monoxide and carbon dioxide to a minute amount and obtaining the intended acrylonitrile at a high selectivity it is very important that a solid solution of antimony oxide and stannic oxide wherein the atomic ratio expressed in percentage of antimony and tin is within the ranges of Sb=70–30% and Sn=30–70% be used in combination with 2–20% by weight, based on the overall weight of the combination, of an oxide of either indium, iridium or ruthenium.

We claim:

1. In a process for the production of acrylonitrile by contacting propylene, ammonia and oxygen with a solid oxidizing catalyst in the vapor phase at a temperature of 350° to 500° C., the improvement wherein said oxidizing catalyst consists essentially of:

(a) a solid solution of antimony oxide and stannic oxide in an atomic ratio of 70–30% Sb to 30–70% Sn, said solid solution being obtained by hydrolyzing and coprecipitating the hydroxides or oxides of antimony and tin from a mixture of soluble salts of antimony and tin and calcining the coprecipitated hydrolysis product at a temperature of 300° to 700° C.; and (b) a metal oxide selected from $In_2O_2$, $Ir_2O_3$, $IrO_2$ and $RuO_2$, the weight ratio of said solid solution (a) to said metal oxide (b) being within the range 98:2–80:20.

References Cited

UNITED STATES PATENTS 3,269,957   8/1966   Bethell _____ 260—465.3

JOSEPH P. BRUST, Primary Examiner

U.S. Cl. X.R.

252—455, 456, 464, 472; 260—604 R

UNITED STATES PATENT OFFICE
CERTIFICATE OF CORRECTION

Patent No. 3,641,101   Dated February 8, 1972

Inventor(s) KEISHO YAMADA ET AL

It is certified that error appears in the above-identified patent and that said Letters Patent are hereby corrected as shown below:

Claim 1, line 14 delete "$In_2O_2$" and substitute

-- $In_2O_3$ -- .

Signed and sealed this 30th day of May 1972.

(SEAL)
Attest:

EDWARD M. FLETCHER, JR.
Attesting Officer

ROBERT GOTTSCHALK
Commissioner of Patents